United States Patent
Suzuki et al.

(10) Patent No.: US 7,764,877 B2
(45) Date of Patent: Jul. 27, 2010

(54) IMAGING APPARATUS, IMAGE DISPLAY CONTROL METHOD, AND PROGRAM

(75) Inventors: Yasufumi Suzuki, Tokyo (JP); Masahiko Minagawa, Saitama (JP); Toru Furukawa, Tokyo (JP)

(73) Assignee: Sony Corporation, Tokyo (JP)

( * ) Notice: Subject to any disclaimer, the term of this patent is extended or adjusted under 35 U.S.C. 154(b) by 230 days.

(21) Appl. No.: 12/134,587

(22) Filed: Jun. 6, 2008

(65) Prior Publication Data

US 2009/0003817 A1  Jan. 1, 2009

(30) Foreign Application Priority Data

Jun. 28, 2007  (JP) ............................. 2007-171251

(51) Int. Cl.
G03B 13/00  (2006.01)
(52) U.S. Cl. .................................. 396/124; 348/333.03
(58) Field of Classification Search ................. 396/124, 396/127; 348/333.03
See application file for complete search history.

(56) References Cited

U.S. PATENT DOCUMENTS

2004/0189856 A1* 9/2004 Tanaka ........................ 348/345
2006/0204235 A1* 9/2006 Sasaki ........................ 396/124

FOREIGN PATENT DOCUMENTS

JP  6-113187  4/1994

OTHER PUBLICATIONS

U.S. Appl. No. 12/601,838, filed Nov. 25, 2009, Suzuki, et al.

* cited by examiner

*Primary Examiner*—W. B. Perkey
*Assistant Examiner*—Fang-Chi Chang
(74) *Attorney, Agent, or Firm*—Oblon, Spivak, McClelland, Maier & Neustadt, L.L.P.

(57) ABSTRACT

In the present invention, there is provided an imaging apparatus including: a mode determiner configured to determine a mode that is set; an automatic focus detectable frame display controller configured to, if a predetermined mode is found set by the mode determiner, control displaying an automatic focus detectable frame for a predetermined period of time to delete the displayed automatic focus detectable frame after passing of the predetermined period of time; and a main controller configured to, if an automatic focus point is set at a position outside the automatic focus detectable frame, make the automatic focus detectable frame display controller control redisplaying the automatic focus detectable frame.

10 Claims, 5 Drawing Sheets

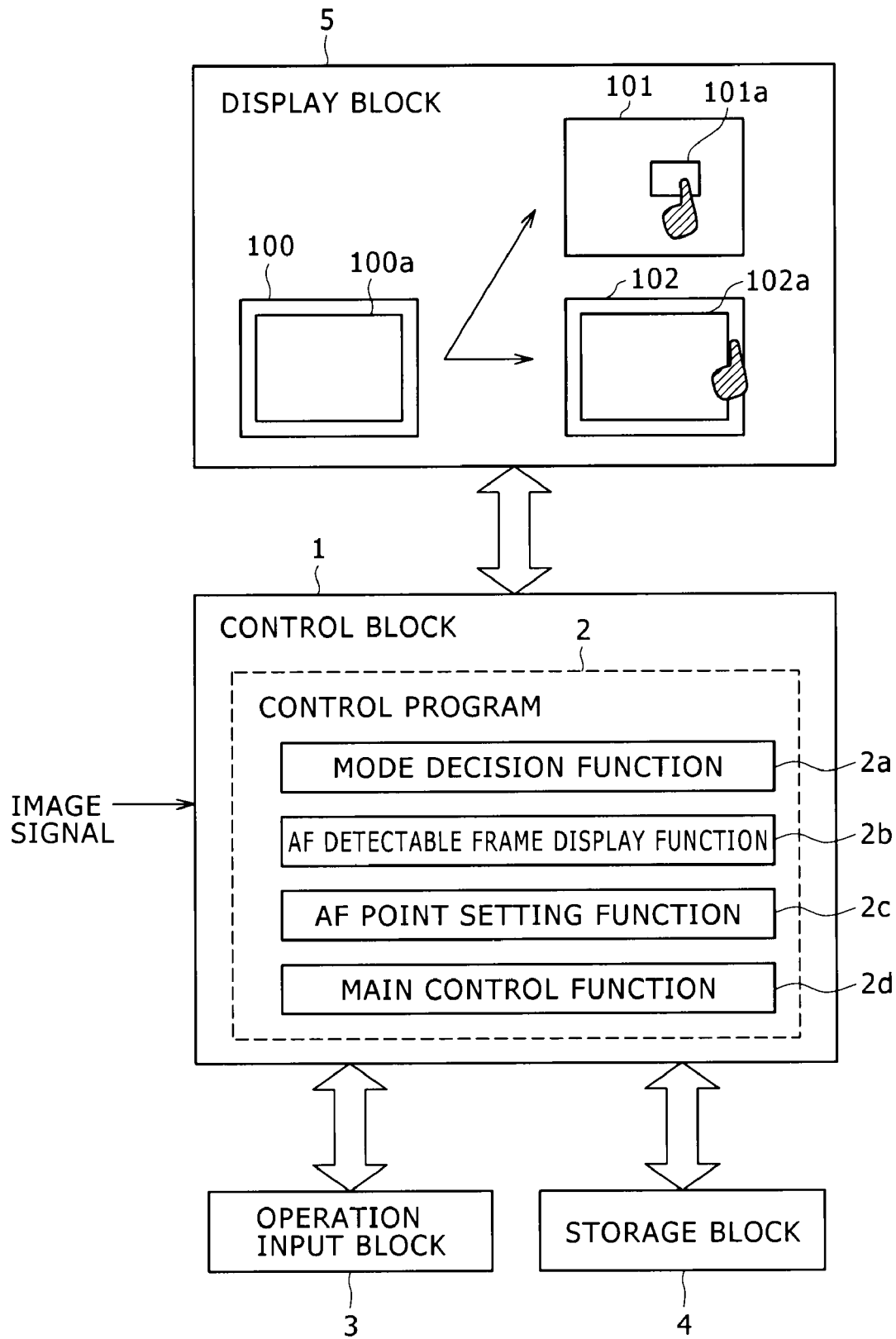

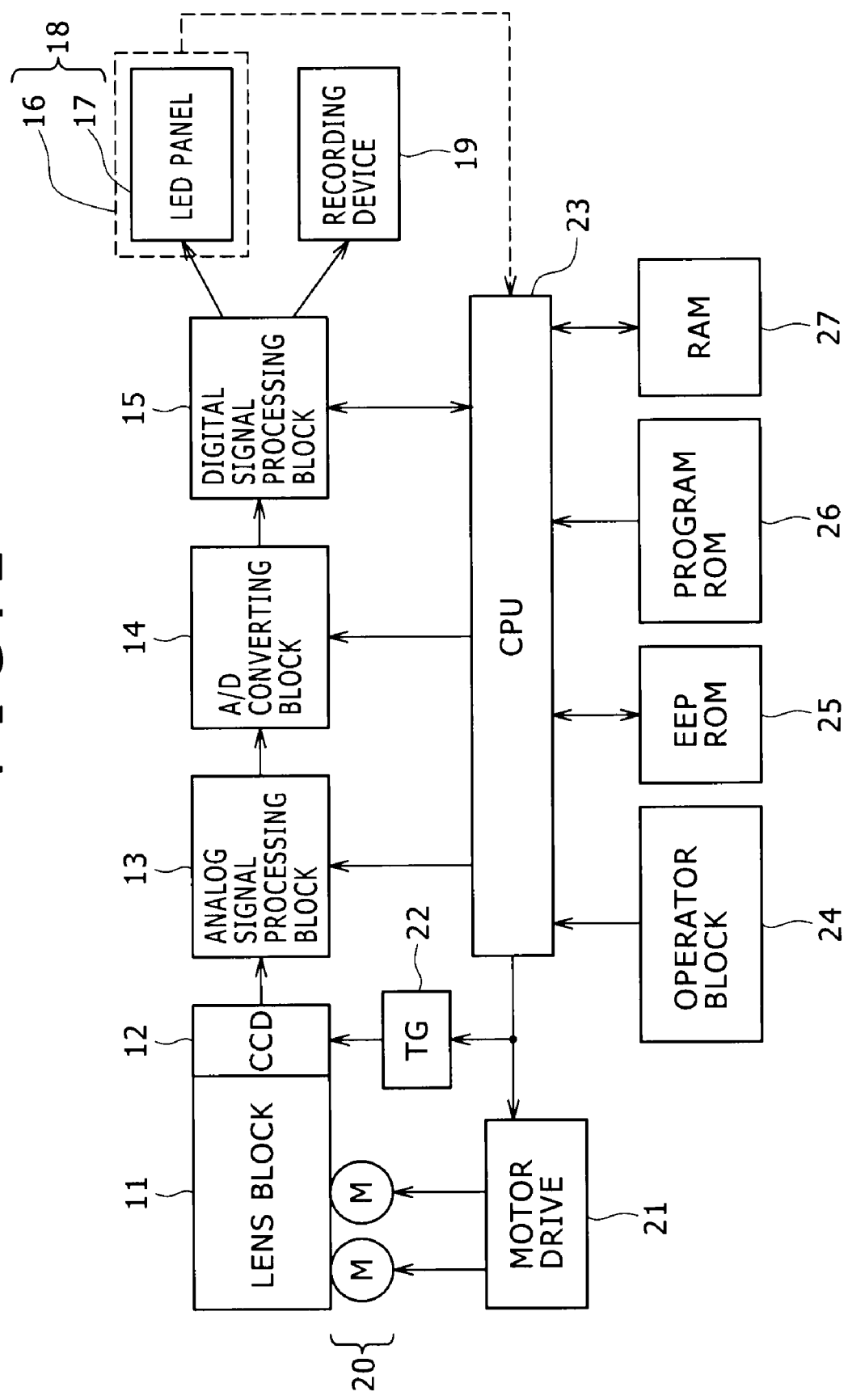

IMAGING APPARATUS, IMAGE DISPLAY CONTROL METHOD, AND PROGRAM

CROSS REFERENCES TO RELATED APPLICATIONS

The present invention contains subject matter related to Japanese Patent Application JP 2007-171251 filed in the Japan Patent Office on Jun. 28, 2007, the entire contents of which being incorporated herein by reference.

BACKGROUND OF THE INVENTION

1. Field of the Invention

The present invention relates to an imaging apparatus such as a digital still camera, an image display control method, and a program and, more particularly, to an imaging apparatus, an image display control method, and a program that are configured to properly display an AF (Automatic Focus) detectable range.

2. Description of the Related Art

It is known that the AF function is installed on digital still cameras, digital video cameras, and other imaging apparatuses. This AF function is intended to automatically focus a subject. Generally, often, in the auto focus feature, a subject is taken by an image sensor, such as CCD (Charge Coupled Device) or CMOS (Complementary Metal Oxide Semiconductor), to automatically determine a focal position on the basis of the contrast of the taken image.

Today, in order for a user to focus a desired position in a taken image, a so-called spot AF function is also practicable in which the user can set an AF point as desired in an AF detectable frame. If this spot AF mode is set, the user selects a desired AF point in an AF detectable frame, sets the selected AF point on screen by doing a predetermined operation, and then executes a usual imaging operation.

It should be noted that, for example, Japanese Patent Laid-open No. Hei 6-113187 discloses an automatic focus camera apparatus in which the user determines a focus area at a position where the user wants to focus a subject in a CCD frame by specifying appropriate size, shape, and position on a touch panel for example by use of a focus area selecting apparatus while looking at a display apparatus (refer to paragraph [0021] for example).

However, with the above-mentioned technique associated with Japanese Patent Laid-open No. Hei 6-113187, although an AF frame (or a focus area) indicative of an AF point is displayed in a screen, an AF detectable frame indicative of an AF point settable range is not displayed. On the other hand, leaving this AF detectable frame always displayed on screen gives a nuisance in selecting a desired scene to the user wanting to take a picture with a desired composition while checking a through-image on screen.

In addition, it is possible for the user to intentionally switch between display and no-display of the AF detectable frame on screen, but only by means of complicated operation.

SUMMARY OF THE INVENTION

Therefore, the present invention addresses the above-identified and other problems associated with related-art methods and apparatuses and solves the addressed problems by providing an imaging apparatus, an image display control method, and a computer program that are configured to properly suggest an AF detectable range, thereby enabling the proper setting of an AF point at the time of a spot AF operation, for example.

In an embodiment according to the invention, there is provided an imaging apparatus including: a mode determiner configured to determine a mode that is set; an automatic focus detectable frame display controller configured to, if a predetermined mode is found set by the mode determiner, control displaying an automatic focus detectable frame for a predetermined period of time to delete the displayed automatic focus detectable frame after passing of the predetermined period of time; and a main controller configured to, if an automatic focus point is set at a position outside the automatic focus detectable frame, make the automatic focus detectable frame display controller control redisplaying the automatic focus detectable frame.

In another embodiment of the present invention, there is provided an imaging apparatus including: a mode determiner configured to determine a mode that is set; an automatic focus detectable frame display controller configured to, if a predetermined mode is found set by the mode determiner, control displaying an automatic focus detectable frame that is one of predetermined reference markers onto a display block for a predetermined period of time and delete the automatic focus detectable frame after passing of the predetermined period of time; an automatic focus point setter configured to set an automatic focus point in accordance with an operation input; and a main controller configured to, if an automatic focus point is set outside the automatic focus detectable frame, make the automatic focus detectable frame display controller control redisplaying the automatic focus detectable frame onto the display block.

BRIEF DESCRIPTION OF THE DRAWINGS

Other features of the invention will become apparent from the following description of embodiments with reference to the accompanying drawings in which:

FIG. 1 is a schematic diagram illustrating an imaging apparatus practiced as a first embodiment of the invention;

FIG. 2 is a block diagram illustrating an exemplary configuration of an imaging apparatus practiced as a second embodiment of the invention;

DETAILED DESCRIPTION OF THE PREFERRED EMBODIMENTS

Figure 3A:
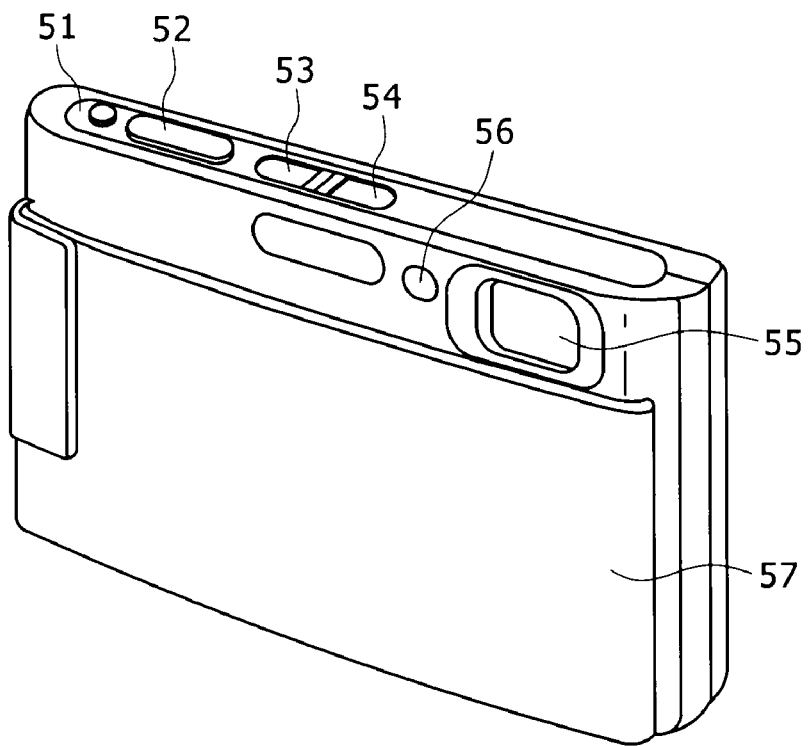
FIG. 3A is a front perspective view of the imaging apparatus according to the second embodiment.

This invention will be described in further detail by way of embodiments thereof with reference to the accompanying drawings.

Now, referring to FIG. 1, there is shown an exemplary configuration of an imaging apparatus practiced as a first embodiment of the invention.

As shown in FIG. 1, this imaging apparatus has a control block 1, an operation input block 3, a storage block 4, and a display block 5. The control block 1 reads a control program 2 from the storage block 4 and executes this program to function as a mode decision function 2a, an AF detectable frame display function 2b, an AF point setting function 2c, and a main control function 2d.

In the above-mentioned configuration, the control block 1 determines, through the mode decision function 2a, the type of a mode that has been set. To be more specific, a multiple AF mode, a spot AF mode, and so on are available with this imaging apparatus and the control block 1 determines one of these modes that is now on.

The multiple AF mode denotes a mode for automatic focusing with the entire screen as reference. The spot AF mode denotes a mode for moving an AF frame to a desired position on the screen to focus a very small subject or a narrow area, for example.

For example, if the imaging apparatus is set to the spot AF mode, an AF detectable frame 100a is displayed on a screen 100 of the display block 5 for a predetermined period of time. This makes a user recognize an AF point settable range, thereby prompting the user to set an AF point within the settable range.

Next, upon detection of the user specification of an AF point by a signal given through a touch panel for example that is the operation input block 3, the control block 1 determines whether the specified AF point is within the AF detectable frame range through the main control function 2d. If the AF point is found within the range, the control block 1 indicates the AF point onto a screen 101 of the display block 5 by an AF frame 101a; if the AF point is found outside the range, the control block 1 redisplays an AF detectable frame 102a onto a screen 102 of the display block 5 for a predetermined period of time.

At this moment, no AF frame associated with the AF point is displayed, so that the user recognizes that the user needs to operate the operation input block 3 within the range of AF detectable frame 102a to specify an AF point again.

Thus, the imaging apparatus according to the first embodiment of the invention displays an AF detectable frame if the imaging apparatus is set to a predetermined mode.

The AF detectable range disappears after the passing of a predetermined time.

If no AF point is specified within the AF detectable frame range, the AF detectable frame is displayed again realtime within the screen.

Therefore, the above-mentioned configuration can accurately suggest the user an AF detectable frame, namely, a range in which an AF point can be specified. Further, because the AF detectable frame is not displayed longer than necessary, an operator nuisance can be minimized. Moreover, the above-mentioned configuration can prompt the user to set proper AF points.

The following describes a second embodiment of the invention.

Referring to FIG. 2, there is shown an exemplary configuration of an imaging apparatus practiced as the second embodiment of the invention.

The second embodiment is a further realization of the imaging apparatus practiced as the first embodiment.

As shown in FIG. 2, the imaging apparatus practiced as the second embodiment of the invention has a lens block 11 having an imaging lens, an aperture diaphragm, and a focus lens. Along an optical path of a light of a subject entering through the lens block 11, an image sensor 12 based a CCD (Charge Coupled Device) for example is arranged. The output of this image sensor 12 is connected to the input of a digital signal processing block 15 through an analog signal processing block 13 and an analog/digital (A/D) converting block 14. The output of the digital signal processing block 15 is electrically connected to the inputs of a LED panel 17 and a recording device 19.

The lens block 11 is mechanically connected with an actuator 20 configured for the adjustment of the aperture diaphragm and the movement of the focus lens. The actuator 20 is connected with a motor driver 21 configured to drive and control the actuator 20.

In addition, this imaging apparatus has a CPU (Central Processing Unit) 23, which is connected to the motor driver 21, a timing generator (TG) 22, an operator block 24, an EEPROM (Electrically Erasable Programmable ROM) 25, a program ROM (Read Only Memory) 26, a RAM (Random Access Memory) 27, and a touch panel 16.

It should be noted that the CPU 23 reads a control program from the program ROM 26 and executes the control program to realize control functions, especially, the mode decision function, the AF detectable frame display function, the AF point setting function, and the main control function.

A touch screen 18 is made up by the touch panel 16 and the LED panel 17.

The recording device 19 is a removable medium, such as a disk including a DVD (Digital Versatile Disc) or a semiconductor memory including a memory card, for example, which is detachably loaded on the imaging apparatus. The EEPROM 25 is used to store various kinds of information that are set and data, which should be retained after the power to the imaging apparatus is turned off. The program ROM 26 is used to store programs to be executed by the CPU 23 and the data necessary for this execution. The RAM 27 is used to temporarily store programs and data as a work area for the CPU 23 to execute various processing operations.

In the above-mentioned configuration, the CPU 23 executes programs stored in the program ROM 26 to control other components of the imaging apparatus, thereby executing processing operations in accordance with a signal transmitted from the touch panel 16 or a signal transmitted from the operator block 24. The operator block 24 is operated by the user of the imaging apparatus to transmit signals corresponding to operations done to the CPU 23.

To be more specific, when the touch panel 16 is pressed by operator's finger at a desired position, namely, when an operation by the user is entered, the coordinates of the finger-pressed position are detected and a signal representative of the detected coordinates is transmitted to the CPU 23, which gets information corresponding to the coordinates to execute a processing operation on the basis of this information.

When the light of a subject enters through the lens block 11, the image sensor 12 takes the light and converts the light into an electrical power, thereby outputting an analog image signal. At this moment, the motor driver 21 drives the actuator 20 under the control of the CPU 23. Consequently, the lens block 11 is exposed from or retracted into the housing of the imaging apparatus. In addition, this driving operation adjusts the aperture diaphragm of the lens block 11 and the movement of the focus lens of the lens block 11.

Further, under the control of the CPU 23, the timing generator 22 supplies a timing signal to the image sensor 12. This timing signal controls an exposure time and so on in the image sensor 12. The image sensor 12 operates on the basis of this timing signal supplied from the timing generator 22 to receive the light from a subject entering through the lens block 11 to execute a photoelectric conversion, thereby supplying an analog image signal that is an electrical signal corresponding to an amount of light received to the analog signal processing block 13. Under the control of the CPU 23, the analog signal processing block 13 executes analog signal processing (amplification and so on) on the analog image signal received from the image sensor 12, supplying a resultant image signal to the A/D converting block 14.

Next, under the control of the CPU 23, the A/D converting block 14 converts the analog signal received from the analog signal processing block 13 into a digital signal, supplying the resultant digital image data to the digital signal processing block 15. Under the control of the CPU 23, the digital signal processing block 15 executes digital signal processing, such as noise canceling and so on, on the digital image signal received from the A/D converting block 14, supplying the resultant digital image signal to the LED panel 17 for display.

The digital signal processing block 15 compresses the digital image signal received from the A/D converting block 14 by use of the JPEG (Joint Photographic Experts Group) algorithm, for example, and supplies the resultant compressed digital image signal to the recording device 19 for recording.

Further, the digital signal processing block 15 decompresses the compressed image data recorded to the recording device 19 and supplies the decompressed image data to the LED panel 17 for display. Namely, the digital signal processing block 15 supplies the image data received from the A/D converting block 14 to the LED panel 17, on which a so-called through-image is displayed. In addition, under the control of the CPU 23, the digital signal processing block 15 generates an image of focus frame (or AF frame) for focus control and supplies the generated image to the LED panel 17 for display.

Then, when the user presses the shutter button that is a component of the operator block 24, a release signal is supplied from the operator block 24 to the CPU 23. Thus, when the release signal is supplied to the CPU 23, the CPU 23 controls the digital signal processing block 15 to compress the image data supplied from the A/D converting block 14 to the digital signal processing block 15, thereby recording the compressed signal to the recording device 19.

This imaging apparatus has an AF function. In the imaging apparatus associated with this embodiment, an AF frame is set on an image taken by the image sensor 12 and, on the basis of an image inside this AF frame, a focusing operation is controlled. With this AF function, an AF frame can be set at any desired position on the image displayed on the LED panel 17 and only operating the touch panel 16 configured integrally with the LED panel 17 can control the position and size of the AF frame. The AF processing is realized by the CPU 23 by reading corresponding programs from the program ROM 26.

The imaging apparatus according to the second embodiment features the following. Namely, the CPU 23 determines the current mode and, if the spot AF mode is set, displays an AF detectable frame on the LED panel 17 for a predetermined period of time. This allows the user to recognize an AF point settable range, thereby prompting the user to set an AF point inside the range. Next, upon detection of the specification by the user of a desired AF point by a signal from the touch panel 16, the CPU 23 determines whether the AF point is located inside the range of the AF detectable frame. If the AF point is found inside the range, then the CPU 23 indicates the AF point on the LED panel 17 in an AF frame; if the AF point is found outside the range, then the CPU 23 redisplays the AF detectable frame on the LED panel 17 for a predetermined period of time. At this moment, the AF frame associated with the AF point is not displayed, so that the user recognizes that the user needs to specify an AF point again by operating the touch panel 16 inside the range of the AF detectable frame.

As described above, if the imaging apparatus according to the second embodiment is set to a predetermined mode, an AF detectable frame is displayed and, after passing of predetermined period of time, the AF detectable frame is deleted. If no AF point is specified inside an AF detectable frame, an AF detectable frame is displayed realtime on the screen again. Therefore, this feature accurately indicates the user an AF detectable frame, namely, a range in which an AF point can be specified and does not display the AF detectable frame longer than necessary, thereby preventing the user from being bothered by the displaying of an AF detectable frame. And this feature can prompt the user to set a proper AF point.

Figure 3B:
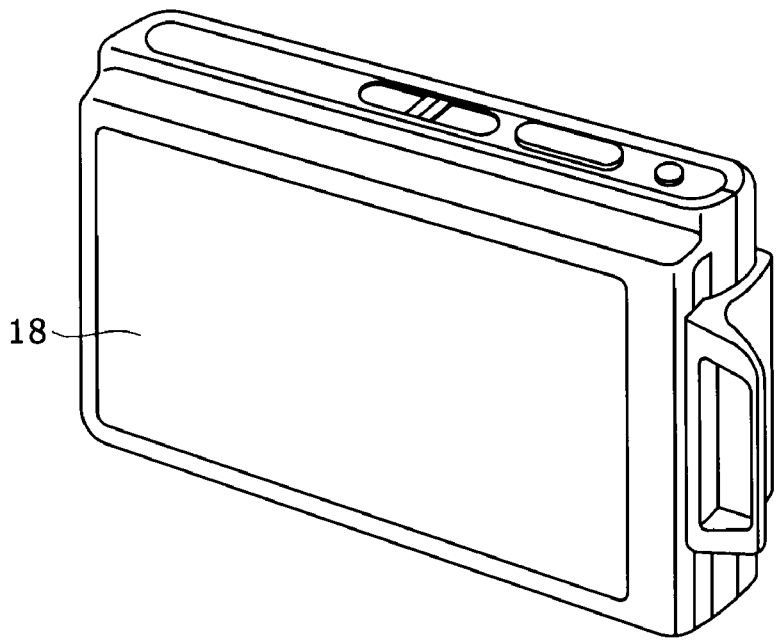
FIG. 3B is a rear perspective view of the imaging apparatus according to the second embodiment.

Now, referring to FIGS. 3A and 3B, there are shown external views of the imaging apparatus associated with the second embodiment of the invention.

FIG. 3A is a front perspective view of this imaging apparatus. FIG. 3B is a rear perspective view of this imaging apparatus.

The front side of the imaging apparatus is covered with a lens cover. When a lens cover 57 on the front side is opened downward, a imaging lens 55 and an AF illuminator 56 conceptually contained in the lens block 11 are exposed. The AF illuminator 56 also functions as self-timer light. On top of the imaging apparatus, a zoom lever (TELE/WIDE) 51, a shutter button 52, a playback button 53, and a power button 54 are arranged. In addition, on the rear side of the imaging apparatus, the touch screen 18 is arranged. The zoom lever 51, the shutter button 52, the playback button 53, and the power button 54 are components of the operator block 24.

Figure 4:
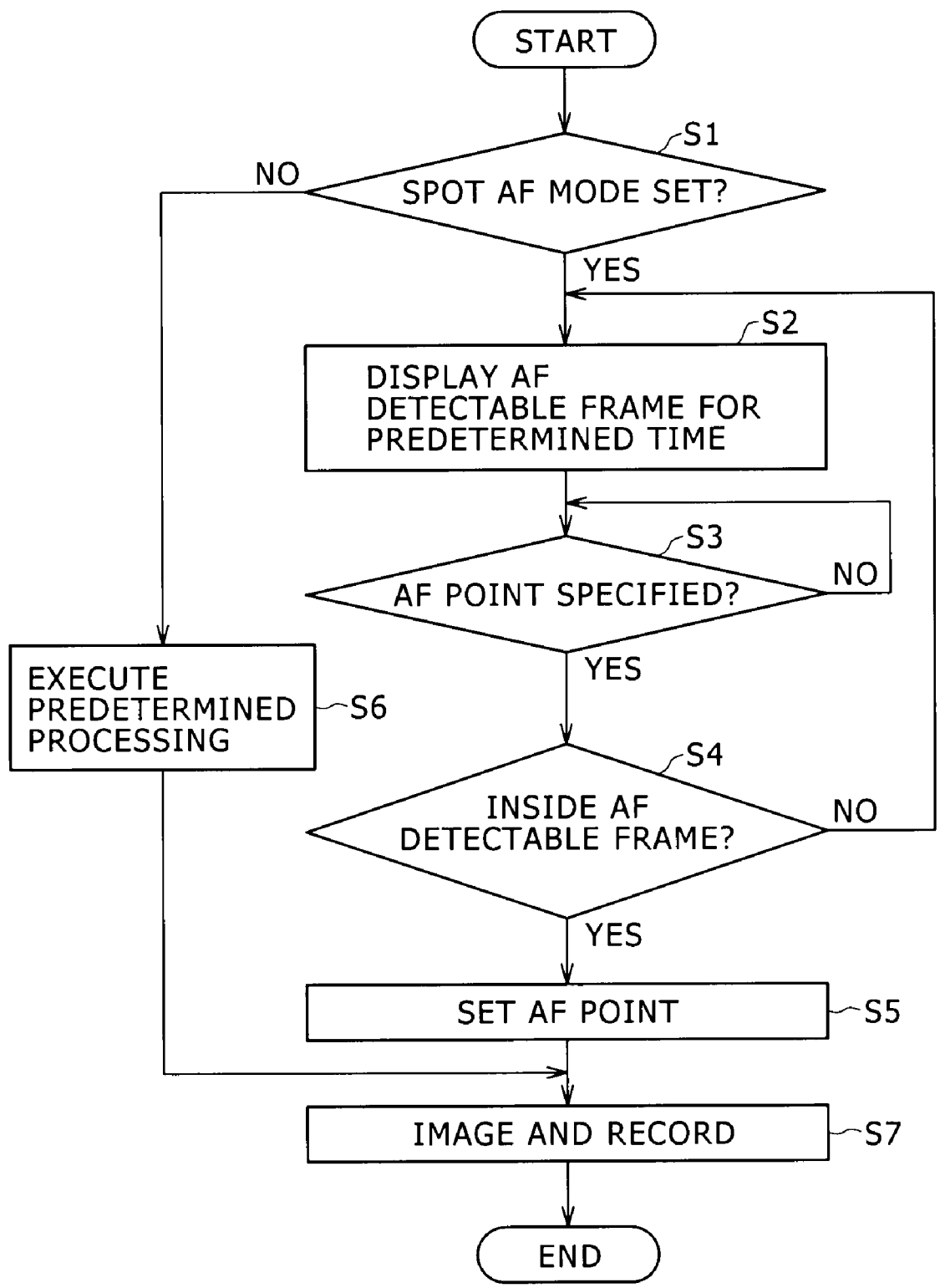
FIG. 4 is a detail flowchart indicative of processing to be executed by the imaging apparatus according to the second apparatus.

The following details processing operations of the imaging apparatus according to the second embodiment of the invention, with reference to the flowchart shown in FIG. 4. The following description will be made also with reference to FIG. 5 from time to time. It should be noted that the following sequence of processing operations is also equivalent to an image display method associated with the second embodiment.

When the processing starts, the CPU 23 determines whether the spot AF mode is set or not (step S1). With this imaging apparatus, the user can select one of the multiple AF mode and the spot AF mode as desired.

If the spot AF mode is not set (NO in step S1), the CPU 23 executes predetermined processing in accordance with the set mode, upon which the procedure goes to step S7. On the other hand, if the spot AF mode is set, the CPU 23 displays an AF detectable frame on the screen of the touch panel 16 for a predetermined period of time (step S2).

Figure 5A:
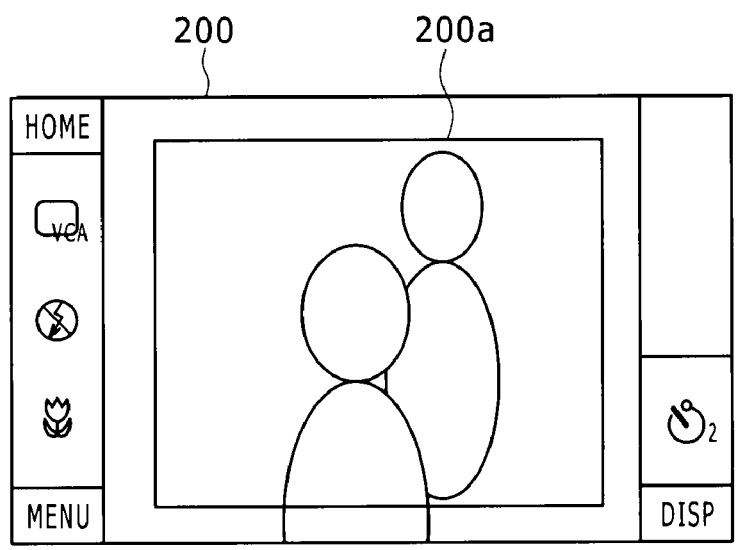
FIGS. 5A, 5B, and 5C are display examples on a touch screen of the imaging apparatus according to the second embodiment.

The AF detectable frame is displayed as shown in FIG. 5A. Namely, an AF detectable frame 200a is displayed in a screen 200. This display is automatically deleted after the passing of the predetermined period of time. This processing prompts the user to set an AF point inside the range of the AF detectable frame 200a.

Next, the CPU 23 determines whether the user has operated the touch panel 16 to specify an AF point (step S3). If an AF point is found set (YES in step S3), then the CPU 23 determines whether the AF point specified on the touch panel 16 is inside the AF detectable frame (step S4).

Figure 5B:
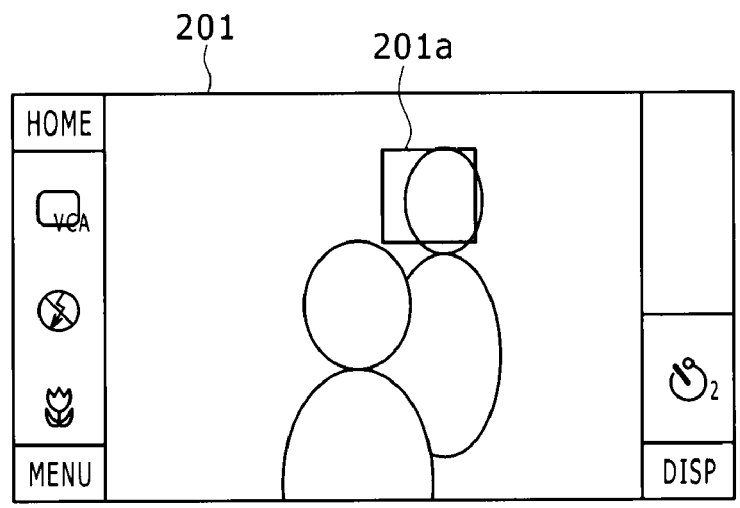

If the AF point specified on the touch panel 16 is found inside the AF detectable frame, a rectangular AF frame 201a with the AF point specified centered thereof on the screen of the touch screen 18 is displayed as shown in FIG. 5B, for example, and this AF point is set (step S5), upon which an imaging operation is executed to record the resultant image data to the recording device 19 (step S7). Thus, a sequence of processing operations comes to an end.

On the other hand, if the AF point specified on the touch panel 16 is not found inside the AF detectable frame, then the procedure returns to step S2 to display an AF detectable frame for a predetermined period of time (step S2).

Figure 5C:
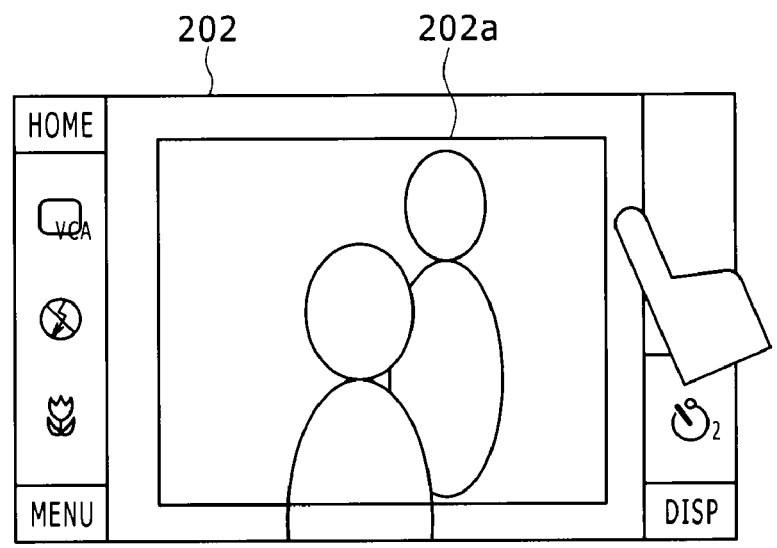

A manner in which the above-mentioned processing is displayed is shown in FIG. 5C. The AF detectable frame 202a is displayed again in the imaging screen on the screen 202 of the touch screen 18 of the imaging apparatus. Consequently, the user is prompted to specify an AF point inside the range of the AF detectable frame 202a again. Then, the above-described processing is executed (steps S3 and S4).

As described above, according to the first and second embodiments of the invention, each imaging apparatus can accurately suggest the user an AF detectable frame, namely, a range in which an AF point can be specified, thereby preventing the user from being bothered with the displaying of an AF detectable frame longer than necessary, which, in turn, can prompt the user to set a proper AF point.

While preferred embodiments of the present invention have been described using specific terms, such description is for illustrative purpose only, and it is to be understood that changes and variations may be made without departing from the spirit or scope of the following claims.

For example, in the above-mentioned embodiments, an AF detectable frame is deleted after passing of a predetermined period of time; however, it is also practicable to make longer a predetermined period of time in which an AF point is displayed, every time same second error, same third error, and so on are detected from an attempt of setting an AF point outside the AF detectable frame for the first time. Alternatively, if an attempt is made to set an AF point outside an AF detectable frame, an AF detectable frame may be displayed again with alert display. Alternative still, this alert display may be made only if attempts are made to set an AF point outside an AF detectable frame more than the number of predetermined times.

What is claimed is:

1. An imaging apparatus comprising:
   mode determining means for determining a mode that is set;
   automatic focus detectable frame display controlling means for, if a predetermined mode is found set by said mode determining means, controlling displaying an automatic focus detectable frame for a predetermined period of time to delete the displayed automatic focus detectable frame after passing of said predetermined period of time; and
   main controlling means for, if an automatic focus point is set at a position outside said automatic focus detectable frame, making said automatic focus detectable frame display controlling means control redisplaying said automatic focus detectable frame.

2. The imaging apparatus according to claim 1, wherein, if control is executed to display said automatic focus detectable frame for said predetermined period of time in said predetermined mode through said automatic focus detectable frame display controlling means and then delete said automatic focus detectable frame after passing of said predetermined period of time followed by specifying of an automatic focus point outside said automatic focus detectable frame, said main controlling means makes said automatic focus detectable frame display controlling means control redisplaying said automatic focus detectable frame.

3. An imaging apparatus comprising:
   mode determining means for determining a mode that is set;
   automatic focus detectable frame display controlling means for, if a predetermined mode is found set by said mode determining means, controlling displaying an automatic focus detectable frame that is one of predetermined reference markers onto a display block for a predetermined period of time and deleting said automatic focus detectable frame after passing of said predetermined period of time;
   automatic focus point setting means for setting an automatic focus point in accordance with an operation input; and
   main controlling means for, if an automatic focus point is set outside said automatic focus detectable frame, making said automatic focus detectable frame display controlling means control redisplaying said automatic focus detectable frame onto said display block.

4. The imaging apparatus according to claim 3, wherein said predetermined mode is a spot automatic focus mode in which an automatic focus point can be set at any position inside said automatic focus detectable frame.

5. An image display control method comprising the steps of:
   determining a mode that is set;
   displaying, if a predetermined mode is found set in said mode determining step, an automatic focus detectable frame for a predetermined period of time to delete the displayed automatic focus detectable frame after passing of said predetermined period of time; and
   redisplaying, if an automatic focus point is set at a position outside said automatic focus detectable frame, said automatic focus detectable frame.

6. The image display control method according to claim 5, wherein, in said redisplaying step, if an automatic focus point is specified outside said automatic focus detectable frame after said automatic focus detectable frame has been displayed for said predetermined period of time, said automatic focus detectable frame is redisplayed.

7. A program stored on a computer readable medium configured to make a computer execute an image display control method, said image display control method comprising the steps of: determining a mode that is set; displaying, if a predetermined mode is found set in said mode determining step, an automatic focus detectable frame for a predetermined period of time to delete the displayed automatic focus detectable frame after passing of said predetermined period of time; and redisplaying, if an automatic focus point is set at a position outside said automatic focus detectable frame, said automatic focus detectable frame.

8. The program stored on a computer readable medium according to claim 7, wherein, in said redisplaying step, if an automatic focus point is specified outside said automatic focus detectable frame after said automatic focus detectable frame has been displayed for said predetermined period of time, said automatic focus detectable frame is redisplayed.

9. An imaging apparatus comprising:
   a mode determiner configured to determine a mode that is set;
   an automatic focus detectable frame display controller configured to, if a predetermined mode is found set by said mode determiner, control displaying an automatic focus detectable frame for a predetermined period of time to delete the displayed automatic focus detectable frame after passing of said predetermined period of time; and
   a main controller configured to, if an automatic focus point is set at a position outside said automatic focus detectable frame, make said automatic focus detectable frame display controller control redisplaying said automatic focus detectable frame.

10. An imaging apparatus comprising:
    a mode determiner configured to determine a mode that is set;
    an automatic focus detectable frame display controller configured to, if a predetermined mode is found set by said mode determiner, control displaying an automatic focus detectable frame that is one of predetermined reference markers onto a display block for a predetermined period of time and delete said automatic focus detectable frame after passing of said predetermined period of time;

an automatic focus point setter configured to set an automatic focus point in accordance with an operation input; and a main controller configured to, if an automatic focus point is set outside said automatic focus detectable frame, make said automatic focus detectable frame display controller control redisplaying said automatic focus detectable frame onto said display block.

* * * * *